United States Patent [19]

Strenzke

[11] Patent Number: 5,043,648
[45] Date of Patent: Aug. 27, 1991

[54] METHOD FOR TWO-CHANNEL SAFE REGULATION OF AN APPARATUS

[75] Inventor: Hilmar Strenzke, Aschaffenburg, Fed. Rep. of Germany

[73] Assignee: Linde Aktiengesellschaft, Wiesbaden, Fed. Rep. of Germany

[21] Appl. No.: 527,756

[22] Filed: May 23, 1990

[30] Foreign Application Priority Data

Jun. 29, 1989 [DE] Fed. Rep. of Germany ....... 3921285
Mar. 24, 1990 [DE] Fed. Rep. of Germany ....... 4009521

[51] Int. Cl.$^5$ .................... G06F 11/00; G05B 19/02; B60L 15/00
[52] U.S. Cl. .................... 318/632; 318/563; 318/564; 364/426.05
[58] Field of Search ................ 318/560–646; 364/184, 185, 186, 426.05; 340/146.2, 825.73; 361/182; 307/296.4, 355, 2; 311/77, 113 R, 151; 328/149

[56] References Cited

U.S. PATENT DOCUMENTS

| 3,149,272 | 9/1964 | Dendy | 318/564 X |
| 3,422,327 | 1/1969 | McBrayer et al. | 318/564 X |
| 3,836,834 | 9/1974 | Abbatiello et al. | 318/563 |
| 4,078,750 | 3/1978 | Tomlinson | 318/563 X |
| 4,165,850 | 8/1979 | Dubreucq | 364/428.05 X |
| 4,209,828 | 6/1980 | Anderson et al. | 364/426.05 |
| 4,345,191 | 8/1982 | Takats et al. | 318/564 |
| 4,556,941 | 12/1985 | Zuber | 364/426.05 |
| 4,558,415 | 12/1985 | Zuber et al. | 364/426.05 |

OTHER PUBLICATIONS

H. Holscher and J. Rader, "Mikrocomputer in der Sicherheitstechnik" (Microcomputers in Safety Technology), Verlag TUV-Rheinland 1984, Chapter 7.3.

Primary Examiner—Paul Ip
Attorney, Agent, or Firm—Webb, Burden, Ziesenheim & Webb

[57] ABSTRACT

A nominal value is supplied both to a control in a first channel and to a regulator in a second channel parallel to the first channel. The control signal and the regulation signal are transmitted to an apparatus to be regulated. The regulation signal is monitored by a regulator monitoring unit, which generates a shutdown signal when a certain regulation signal level is exceeded and thereby controls or regulates the apparatus into a safe state of operation. In order to effect the regulation, an apparatus output quality is detected by a sensor and the output signal from the sensor is substracted from the nominal value at the input of the second channel. Due to the installation of a control in the first channel, only a single sensor is required for secure two-channel regulation.

6 Claims, 1 Drawing Sheet

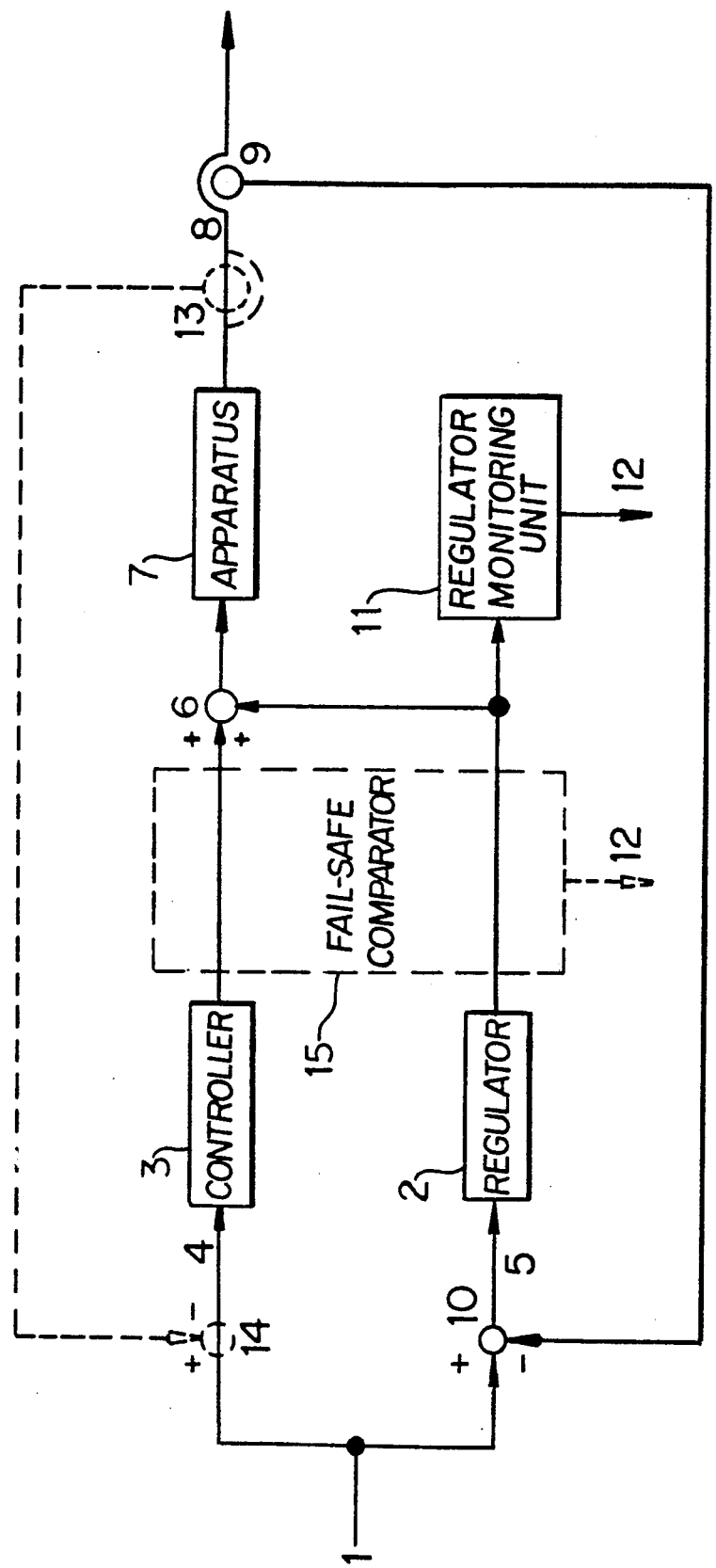

METHOD FOR TWO-CHANNEL SAFE REGULATION OF AN APPARATUS

BACKGROUND OF THE INVENTION

1. Field of the Invention

This invention relates to methods for controlling an apparatus using a two-channel safe regulation arrangement.

2. Description of the Prior Art

In known arrangements for safely regulating an apparatus, a nominal or desired value is converted into an input variable in two channels parallel to each other and is supplied to the apparatus, such as a mechanical apparatus. An output variable of the apparatus is picked up and, after feedback, is compared with the nominal value. In this manner, the apparatus is controlled or regulated into a safe state of operation when different input variables occur at the output of the two channels.

In order to obtain a secure regulation, two regulation circuits are thus superposed. Each regulator has its own channel and its own sensor that detects the apparatus output variable. In order to check the results of the two regulation circuits, a so-called fail-safe comparator is included. This fail-safe comparator generates a shutdown signal that controls or regulates the apparatus into a safe state of operation when the regulation signals on the apparatus do not coincide. Such a two-channel structure is known from the book entitled "Mikrocomputer in der Sicherheitstechnik" (Microcomputers in the safety technology) by H. Holscher and J. Rader, Verlag TUV-Rheinland 1984, Chapter 7.3.

The use of two sensors in such a safety regulation arrangement is often undesirable since the sensors can be expensive, depending on the apparatus output variable to be measured.

It is an object of the present invention to provide two-channel safety regulation of apparatus that works with only one sensor with at least the same security as the prior art arrangements.

SUMMARY OF THE INVENTION

In accordance with the present invention, a nominal value is supplied to a controller in the first channel and to a regulator in the second channel. The controller in the first channel contains a mathematical description of the function of the apparatus to be regulated. The control signal of the first channel is added to the regulation signal of the second channel and the result is supplied to the apparatus. An apparatus output variable is detected by a single sensor and is supplied to an adder before the regulator in the second channel where the nominal value supplied to the regulator is reduced by the sensor signal. The regulation signal is monitored by a regulator monitoring unit and when a prescribed value is exceeded, a shutdown signal is generated which controls or regulates the apparatus into a safe state of operation. Instead of a conventional regulator structure in the first channel, a controller structure without a sensor is now used. The controller, in contrast to the regulator, furnishes very precise signals to an adder before the input of the process (the controlled system), which adds only a small correction signal of the second channel to the control signal of the first channel. However, if the regulation signal (correction signal) of the second channel exceeds established limits, there is apparently an error in the control circuit and a regulator monitoring unit switches the apparatus into a safe state of operation. A costly sensor is dispensed with in such a method.

In one embodiment of the present invention, the control, regulating and monitoring functions are performed by a microcomputer. The operating mode of the apparatus can be stored in mathematical form in this microcomputer. The control functions can be carried out by a first microcomputer and the regulating and monitoring functions can be carried out by a second microcomputer, with data cyclically exchanged between the microcomputers. The fail-safe comparator of the prior art is thus replaced.

According to another embodiment of the present invention, the regulation signal produced in the regulator is limited to a value that is below a value that would have a harmful effect on the apparatus. By this arrangement, even if the regulator monitoring unit includes a time-delay action in generating the shutdown signal, and if the regulation signal coming from the regulator acts on the apparatus with no delay, a dangerous situation is prevented from occurring in the apparatus.

The method of the present invention is particularly well suited for use in the speed regulation of vehicles with hydrostatic drive units. Implementation of the mathematical description of the operating mode of the apparatus to be regulated is very simple to achieve with respect to the rpms in a hydrostatic drive unit. It is desirable in such an application if the signal of a pressure sensor detecting the high pressure in the hydrostatic drive unit is supplied to the regulator monitoring unit and the shutdown signal is generated when a certain value is exceeded. Through detection of the high pressure in the hydrostatic drive unit, the regulator monitoring unit is capable of recognizing whether a situation exists in which the transmission of the regulation variable that was determined according to a mathematical relation stored in the regulator is still valid. That is, it can be determined whether the mathematical relation stored in the regulator still agrees with the states actually existing. Even though a normal regulation signal is present, which does not represent reality, the regulator monitoring unit can still control the apparatus into a safe state of operation.

BRIEF DESCRIPTION OF THE DRAWING

The sole figure is a schematic diagram of a preferred embodiment of a control system incorporating the method of the present invention.

DETAILED DESCRIPTION OF THE PREFERRED EMBODIMENTS

As shown in the figure, a nominal or desired value 1 is supplied to a regulator 2 and to a controller 3 arranged parallel to it. The controller 3 is located in a first channel 4 and the regulator 2 is located in a second channel 5. The output control signal of the controller 3 and the output regulation signal of the regulator 2 are combined in adder 6. The output signal of adder 6 is supplied to a process 7 to be regulated. The apparatus 7 generates an output quality 8 that is detected by a sensor 9, and the output signal generated by the sensor 9 is supplied to adder 10 that is located at the input of the second channel 5. The output signal from the sensor 9 is subtracted from the nominal value 1 in adder 10 and the resultant output signal from adder 10 is supplied to the regulator 2. The output regulation signal of the regulator 2 is also supplied to a regulator monitoring unit 11, which generates a shutdown signal 12 when the regulation signal exceeds a predetermined value.

In the two-channel control systems known in the prior art, a regulator is provided instead of the controller 3, as well as a sensor 13 (shown in dashed lines in the Figure), which detects the apparatus output quality and supplies it to adder 14 (also shown in dashed lines) at the input of the first channel 4. A fail-safe comparator 15 (shown dashed in the Figure) compares the two regulation signals and generates a shutdown signal if a deviation therebetween is present; otherwise, it transmits a control signal to the apparatus 7. Elements 6 and 11 are not present in the known control systems.

The arrangement of the present invention operates as follows: The controller 3 calculates a precise control signal from the nominal value 1 and the control signal is supplied to adder 6. The regulator 2 calculates a small correction variable in relation to the control signal from the nominal value 1, taking into account the apparatus output quality 8, and is supplied as a regulation signal both to adder 6 as well as to the regulator monitoring unit 11. The latter emits a shutdown signal when the regulation signal exceeds a certain level and controls or regulates the apparatus into a safe state of operation.

Having described above the presently preferred embodiments of the present invention, it is to be understood that it may be otherwise embodied within the scope of the appended claims.

I claim:

1. A method for securely regulating the operation of an apparatus comprising the steps of:
   (a) supplying a nominal value to a controller in a first channel and to a regulator in a second channel which is parallel to said first channel, with said controller containing a mathematical description of the function of the apparatus;
   (b) adding a control signal generated by the controller in the first channel to a regulation signal generated by the regulator in the second channel and supplying the combined signal to the apparatus;
   (c) detecting, with a sensor, an output quality of the apparatus, with the sensor developing an output signal in response to the detected output quality;
   (d) reducing the nominal value supplied to the regulator by the output signal developed by the sensor in step (c);
   (e) monitoring the regulation signal with a 20 regulator monitoring unit; and
   (f) generating a shutdown signal for the apparatus when the regulation signal exceeds a prescribed value, whereby the apparatus is controlled into a safe state of operation.

2. The method of claim 1, wherein the control, regulating and monitoring functions are performed by a microcomputer.

3. The method of claim 2, wherein the control functions are performed by a first microcomputer and the regulating and monitoring functions are performed by a second microcomputer and data are exchanged cyclically between the microcomputers.

4. The method of claims 1, 2 or 3, wherein the regulation signal generated by the regulator is limited to a value that is below a value that exerts a harmful effect on the apparatus.

5. The method of claim 4, wherein the apparatus is a vehicle with hydrostatic drive units and the method regulates the speed of such a vehicle.

6. The method of claim 5, wherein the signal of a pressure sensor detecting the high pressure in the hydrostatic drive unit is supplied to the regulator monitoring unit and the shutdown signal is generated when a certain value is exceeded.

* * * * *

UNITED STATES PATENT AND TRADEMARK OFFICE
CERTIFICATE OF CORRECTION

PATENT NO. : 5,043,648
DATED : August 27, 1991
INVENTOR(S) : Hilmar Strenzke It is certified that error appears in the above-identified patent and that said Letters Patent is hereby corrected as shown below:

Column 1 Line 39 after "of" insert --an--.

Column 1 Line 63 "process" should read --apparatus--.

Column 2 Line 60 "a process" should read --an apparatus--.

Claim 1 (e) Line 11 Column 4 after "a" delete --20--.

Signed and Sealed this

Twenty-ninth Day of December, 1992

Attest:

DOUGLAS B. COMER

*Attesting Officer*  *Acting Commissioner of Patents and Trademarks*